United States Patent [19]

Black

[11] 4,364,967
[45] Dec. 21, 1982

[54] NEUTRAL FLAVORED HIGH STABILITY PEANUT PASTE CHOCOLATE MIX

[75] Inventor: David J. Black, Tyrone, Pa.
[73] Assignee: James W. Gardner Enterprises, Inc., Tyrone, Pa.
[21] Appl. No.: 196,321
[22] Filed: Oct. 14, 1980
[51] Int. Cl.³ .............................................. A23L 1/36
[52] U.S. Cl. .................................. 426/632; 426/660; 426/438; 426/486
[58] Field of Search .............. 426/632, 438, 473, 518, 426/486, 660, 633, 631

[56] References Cited

U.S. PATENT DOCUMENTS

| | | | |
|---|---|---|---|
| 1,142,346 | 6/1915 | Mariner | 426/631 |
| 3,266,905 | 8/1966 | Baker et al. | 426/486 |
| 3,645,752 | 2/1972 | Baxley | 426/632 |
| 3,901,977 | 8/1975 | Rebane | 426/631 |
| 4,113,889 | 9/1978 | Baxley | 426/632 |
| 4,119,740 | 10/1978 | Crespo | 426/631 |

OTHER PUBLICATIONS

Woodroof, Peanuts: Production, Processing, Products, published by the AVI Publishing Co., Inc., pp. 229-232 (1973).

Primary Examiner—Raymond N. Jones
Assistant Examiner—George C. Yeung
Attorney, Agent, or Firm—Morse, Altman, Oates & Dacey

[57] ABSTRACT

A highly stable peanut paste for use as an extender to chocolate is produced by first pressing blanched peanuts to remove a substantial portion of the natural oil. The pressed nuts are then roasted in a first oil bath to reconstitute them and then drained. While still hot, the roasted nuts are transferred to a second quenching bath of a high stability oil. The nuts are then milled to a paste, degassed and cooled and then mixed with chocolate.

3 Claims, No Drawings

NEUTRAL FLAVORED HIGH STABILITY PEANUT PASTE CHOCOLATE MIX

BACKGROUND OF THE INVENTION

1. Field of the Invention

This invention relates generally to food extenders and their manufacture and more particularly is directed towards a neutral flavored peanut paste that is especially useful as an extender to food products especially chocolate and to the method of manufacturing the paste. The paste also provides means for lowering the viscosity of the chocolate and other food products.

2. Description of the Prior Art

Because of the widespread use and popularity of chocolate for a variety of different candies and bakery products, its cost as well as the price of the end food product have experienced sharp increases in recent years. Despite the long use of chocolate and considerable research into its preparation, there stil exists a number of problems associated with some chocolate products. For example, many chocolate-based candies have a relatively short shelf life. Also, chocolate coated candy products often times will develop a surface bloom which detracts from the consumer appeal of the candy product. Other problems relate to the manufacture of the candy wherein very precise control must be maintained over the temperature of the chocolate which is used to enrobe the candy to prevent over tempering of the candy.

Accordingly, it is an object of the present invention to provide improvements in chocolate-containing food products. Another object of this invention is to provide a low cost, neutral flavored extender for use in chocolate. A further object of this invention is to provide an extender for chocolate adapted to improve the shelf life and other characteristics of the chocolate in order to produce an improved food product. Yet another object of this invention is to provide a novel method for producing a neutral flavored peanut paste for use as a food extender for various food products especially to chocolate.

SUMMARY OF THE INVENTION

This invention features the method of making a neutral flavored peanut paste for use especially as an extender for chocolate, comprising the steps of first pressing out a substantial portion of the natural oil of blanched peanuts. The pressed, partially defatted peanuts, are then reconstituted to their original size and shape by roasting the nuts in a first oil bath at a relatively high temperature and then draining and transferring them to a second oil bath at a lower temperature which quenches the nuts in a high stability oil. The nuts are then milled into a paste followed by a second optional milling step at which time certain selected flavorings may be added. From the milling stage the paste is degassed to remove entrained oxygen. Finally, the degassed paste is passed through a heat exchanger for cooling to a predetermined temperature and packaged.

DETAILED DESCRIPTION OF THE PREFERRED EMBODIMENT

In U.S. Pat. Nos. 2,003,415 and 3,294,549 there are disclosed processes for reducing the calorie content of nuts by pressing the nuts under high pressure, typically by the use of a hydraulic press, so as to separate a substantial portion of the nut oil from the whole nut without breaking the nut at the same time. The nut meats may then be reconstituted to more or less their original size and shape primarily by applying steam to the nuts or by immersing them in water. The methods disclosed in these patents are capable or removing up to 80% or so of the natural oil from the nuts and the resulting low calorie nut is a desirable item as a dietetic food product. However, nuts processed according to the foregoing displayed a somewhat poor shelf life as well as certain undesirable characteristics such as flavor, texture and mouth feel. In U.S. Pat. No. 3,645,752 there is disclosed a method for improving the shelf life of the nuts as well as enhancing other characteristics by reconstituting the nut in a two step process in which the nuts are roasted in one oil bath at relatively high temperature and quenched in a second oil bath of lower temperature and of a high stability oil.

In accordance with the present invention, an improved method is provided for producing a neutral flavored peanut paste characterized by a long shelf life and especially useful as an extender to chocolate. The process involves first blanching the peanuts and then subjecting the blanched peanuts having about 3 to 8 wt % moisture to a pressing operation, typically in a hydraulic press, to remove 20 to 90 wt % of the oil contained therein without splitting the nuts by physically distorting the nuts. The blanched, pressed nuts are then simultaneously reconstituted and roasted in a first bath by immersing the nuts in oil, preferably a high stability oil, for a period of three to four minutes. The roasting temperature of the oil preferably is in the range of 275° to 350° F. If it is desired to introduce and retain a roasted flavor in the nuts, the temperature of the first oil bath should be in the range of 330° to 350° F. On the other hand, if it is desired that the end product not have the characteristic roasting flavor, then the bath temperature at this stage should be between 275° to 350° F. During the oil roasting step the nuts will be reconstituted back substantially to their original shape and size.

After the oil roasting operation, the nuts are removed from the first bath, drained and, while still hot, transferred to second oil bath of a substantially lower temperature than that of the first bath. This quenches the roasting treatment and releases vacuum developed within the nut oil cells by the reconstitution process. In the second oil bath the oil of the bath replaces the natural oil in the nut, the replacement oil preferably being of a high stability type. Flavor impregnants may be included in the second oil bath, as desired.

The second oil bath is a high stability oil and, preferably, this is the same type of oil used in the first bath. However, the temperature of the second bath should be in the range of 140° to 170° F. with a temperature of 150° F. preferred. Residence time of the nuts in the second oil bath normally should not be more than three minutes, although for particular batches of nuts this time may be increased or decreased insofar as some nuts may absorb oil more quickly than others. For example, for an especially absorbant type of peanut a one minute dwell time of the nuts in the second bath is sufficient, whereas a less absorbant peanut may require a residence time of five to six minutes. In any event the peanuts preferably absorb sufficient oil in the second bath that the end product will contain 45 to 60% by weight high stability oil, preferably about 55% by weight. When taken from the second bath the nuts are then cooled, as by a cooling tunnel, to a temperature of at least 90° F. to cause the oil content to set up and thereby prevent greasiness in the product.

When the second oil bath has quenched the nuts, the now-stabilized impregnated and cooled peanuts are milled into a paste by means of an appropriate milling or grinding machine to the desire particle size. At this point additives such as sugar, salt and other functional or flavoring materials may be mixed into the paste, as desired. In the grinding operation, equipment such as a Bauer Peanut Butter Mill producing a coarse paste may be used to advantage. The first grinding operation typically produces a coarse paste having a temperature of 130° to 140° F. If a finer paste is desired, a second milling operation is carried out. Preferably, the second milling operation is carried out after an optional 1% each of sugar, salt, etc. has been added to the ground paste and blended in a mixing kettle. The blended paste is then pumped through the second mill which may be an Urschel Comitrol Mill which produces a finely ground paste with a particle size of less than 74 microns and a temperature in the range of 150° to 160° F.

From the second milling operation, the paste is pumped into a vacuum kettle, or the like, and degassed for a period of 10 to 15 minutes for a batch operation of 2 to 5 minutes in a continuous operation at a vacuum of 20 to 25" of mercury. This treatment removes entrained oxygen which, if left in the paste, could adversely effect stability and flavor. From the degassing operation, the paste is then pumped through a heat exchanger adapted to cool the paste to a temperature of about 90° F. at which point the paste is then packaged. In practice it has been found that a Votator swept surface heat exchanger produces satisfactory results in cooling the paste to the desired temperature. The residence time of the paste in the heat exchanger typically is in the range of one to four minutes depending on the throughput rate which is sufficient to bring the temperature of the milled and degassed paste down to the desired temperature of 90° F. for packaging.

The paste produced by the foregoing process is characterized by a neutral flavor and high stability. It is particularly useful in confectionery and bakery products as a substitute for filbert paste, which is commonly used in some candy products, or as an extender for pure chocolate or milk chocolate-type products. The high stability paste imparts improved shelf stability in that it reduces the development of bloom that is sometimes encountered with regular chocolate products and acts as a wetting agent to yield a more uniform product from an appearance standpoint. The streaky white finish referred to in the trade as "fat bloom" is the result of unstable crystal growth resulting in bad setting characteristics in chocolate. Some forms of crystal growth are more stable than others and bloom occurs when fat migrates to the surface of the product.

When the high stability paste is incorporated as an extender to chocolate at levels from 5 to 20% product by weight, the flow properties of the chocolate are improved which enhances the enrobing properties during the coating process. Frequently, when enrobing with pure chocolate, the chocolate will become over tempered. This causes improper flow and results in poor coating performance. The addition of the peanut paste to the chocolate enhances the flow properties of the chocolate where there is a more uniform flow during the enrobing process. In order to achieve a good product involving chocolate or chocolate coating, a chocolate must be properly tempered. As applied to chocolate tempering means the development of a high proportion of the right kind of fat crystals so that this seed will then form the nucleus for the remaining liquid fat contained in the tempered chocolate coating. This fat will form different types of crystals depending upon the way the chocolate is tempered and cooled and the ratio of these crystals one to another will vary over a wide range.

By way of background information, chocolate essentially is a very fine mixture of minute solid sugar, milk, cocoa, flavorings and additives, all suspended in well dispersed cocoa butter. When chocolate sets hard, it is the fat or cocoa butter that is the setting agent.

Cocoa butter and similar fats are capable of setting in different forms and, when applied to chocolate, these characteristics affect the whole surface finish, color, setting time and shelf life. Cocoa butter is a fat containing several different tri-glycerides which are made up of fatty acids. It is these fatty acids which provide the setting problems associated with cocoa butter.

Different fatty acids have various ranges of melting and setting points and affect crystal growth in cocoa butter when it solidifies. It has been found that some forms of crystal growth are more stable than others and generally there are four recognized types:

Gamma—crystallizes under 62.5° F. with a melting range up to 62.5° F. It is considered to be unstable.

Alpha—crystallizes from Gamma with a melting range up to 75° F. It is also considered to be unstable.

Beta Prime—crystallizes 62.5° F. to 72.5° F. with a melting range from 59° F. to 85° F. It is considered to be semi-stable.

Beta—crystallizes at 72.5° F. to 92.5° F. with a melting range from 80° F. to 95° F. It is considered to be stable.

The first three forms of crystal growth which are considered as unstable, result in bad setting characteristics in chocolate and is exhibited by a different color. Apart from bad color, the fat will migrate to the surface and show the streaky gray-white finish known as fat bloom.

The more stable form, Beta, provided it is kept small in size in the tempering process, is the ideal form. It has a higher melting point and a higher setting range than the other three forms. It will give a good flow characteristic before it solidifies and good color results because of the fine and close crystal growth. This stable growth prevents stresses and cracking associated with lesser crystals forms. This, of course, helps prevent ingress of moisture upon solidifying and fat migration under varying storage conditions. The more stable Beta form with its high melting point can be stored at high temperature without adverse effects.

The addition of the peanut paste made according to the present invention to chocolate has shown improvement in the mouthing quality of the chocolate product wherein there is a more rapid release of the chocolate, resulting in improved flavor.

In comparison to filbert and almond paste which are sometimes incorporated into certain confectionery products containing chocolate, the high stability peanut paste has equal or superior shelf life to these products. It is significantly superior to peanut paste made from regular roasted peanuts containing all of the natural peanut oil which is about 50% by weight.

The high stability peanut paste may also be utilized in other confectionery products such as fudge and truffles imparting better mouth feel and improved flavor release in these types of products. Other possible uses would include certain bakery products and/or marzipan products which have principally an almond flavored base.

Certain control can be maintained over the character of the end product according to the type of oil used in the two baths. For example, using an oil with a melting point at about body temperature will produce a candy product which will melt in the mouth. On the other hand, if the oil has too high a melting point the resulting food product leaves a slightly waxy taste. Preferably, the melting point of the oil should be about the same as the melting point of the chocolate so that the oil is solid at room temperature and will melt at about 80° F.

Although various types of high stability oils can be used for this purpose coconut oil has been found to be satisfactory. Other high stability oils can also be used to advantage.

While the invention has been described with particular reference to the preferred embodiment, numerous modifications thereto will appear to those skilled in the art.

For example, the paste may be used with various types of chocolate materials including dark chocolate, milk chocolate and various preparations thereof. While certain equipment has been suggested for such operations as milling and cooling, obviously many machines are available for these purposes.

Having thus described the invention, what I claim and desire to obtain by Letters Patent of the United States is:

1. A process for producing a chocolate extender, said process comprising the steps of:
   (a) blanching a starting batch of peanuts;
   (b) pressing said peanuts in order to distort said peanuts while substantially preserving their particle integrity in order to remove a substantial proportion of the natural oil contained therein;
   (c) reconstituting and roasting said peanuts while substantially preserving their particle integrity in a first bath of high stability oil in the range of from 275° to 350° F.;
   (d) quenching said peanuts while substantially preserving their particle integrity in a second bath of high stability oil at a temperature substantially in the range of from 140° to 170° F.;
   (e) said high stability oil having a melting point approximately equal to that of chocolate;
   (f) said high stability oil replacing said natural oil in said peanuts to produce an intermediate batch of peanuts containing from 45 to 60 weight percent of said high stability oil;
   (g) cooling said peanuts while substantially maintaining their particle integrity to set up said high stability oil therein;
   (h) milling said peanuts into a paste characterized by a particle size of less than 74 microns;
   (i) and vacuum degassing said paste to substantially remove entrained oxygen;
   (j) said paste being characterized by substantially neutral flavor, high stability, and compatibility with chocolate.

2. A chocolate extender produced by a process comprising the steps of:
   (a) blanching a starting batch of peanuts;
   (b) pressing said peanuts in order to distort said peanuts while substantially preserving their particle integrity in order to remove a substantial proportion of the natural oil contained therein;
   (c) reconstituting and roasting said peanuts while substantially preserving there particle integrity in a first bath of high stability oil in the range of from 275° to 350° F.;
   (d) quenching said peanuts while substantially preserving their particle integrity in a second bath of high stability oil at a temperature substantially in the range of from 140° to 170° F.;
   (e) said high stability oil having a melting point approximately equal to that of chocolate;
   (f) said high stability oil replacing said natural oil in said peanuts to produce an intermediate batch of peanuts containing from 45 to 60 weight percent of said high stability oil;
   (g) cooling said peanuts while substantially maintaining their particle integrity to set up said high stability oil therein;
   (h) milling said peanuts into a paste characterized by a particle size of less than 74 microns;
   (i) and vacuum degassing said paste to substantially remove entrained oxygen;
   (j) said paste being characterized by substantially neutral flavor, high stability, and compatibility with chocolate.

3. A composition comprising chocolate and a chocolate extender, said chocolate extender having a concentration in the range of from 5–20 percent by weight and resulting from a process comprising the steps of:
   (a) blanching a starting batch of peanuts;
   (b) pressing said peanuts in order to distort said peanuts while substantially preserving their particle integrity in order to remove a substantial proportion of the natural oil contained therein;
   (c) reconstituting and roasting said peanuts while substantially preserving their particle integrity in a first bath of high stability oil in the range of from 275° to 350° F.;
   (d) quenching said peanuts while substantially preserving their particle integrity in a second bath of high stability oil at a temperature substantially in the range of from 140° to 170° F.;
   (e) said high stability oil having a melting point approximately equal to that of chocolate;
   (f) said high stability oil replacing said natural oil in said peanuts to produce an intermediate batch of peanuts containing from 45 to 60 weight percent of said high stability oil;
   (g) cooling said peanuts while substantially maintaining their particle integrity to set up said high stability oil therein;
   (h) milling said peanuts into a paste characterized by a particle size of less than 74 microns;
   (i) and vacuum degassing said paste to substantially remove entrained oxygen;
   (j) said paste being characterized by substantially neutral flavor, high stability, and compatibility with chocolate.

* * * * *